(12) United States Patent
Chen et al.

(10) Patent No.: US 7,484,778 B2
(45) Date of Patent: Feb. 3, 2009

(54) PORTABLE COMPUTER HAVING IMPROVED LATCH MECHANISM

(75) Inventors: Zhi-Gang Chen, Shenzhen (CN); Wen-Kang Lo, Tu-Cheng (TW); Xiao-Gang Jiang, Shenzhen (CN)

(73) Assignees: Hong Fu Jin Precision Industry (Shenzhen) Co., Ltd., Shenzhen City, Guangdong Province (CN); Hon Hai Precision Industry Co., Ltd., Taipei Hsien (TW)

( * ) Notice: Subject to any disclaimer, the term of this patent is extended or adjusted under 35 U.S.C. 154(b) by 257 days.

(21) Appl. No.: 11/272,531

(22) Filed: Nov. 10, 2005

(65) Prior Publication Data

US 2006/0103495 A1    May 18, 2006

(30) Foreign Application Priority Data

Nov. 12, 2004    (CN) .......................... 2004 2 0095306

(51) Int. Cl.
    *E05C 19/10* (2006.01)
(52) U.S. Cl. .......................... 292/118; 292/27; 361/683
(58) Field of Classification Search .................. 292/27, 292/34, 37, 116–118, 124, 159; 361/683
    See application file for complete search history.

(56) References Cited

U.S. PATENT DOCUMENTS

| 5,826,922 | A | * | 10/1998 | Wernig | 292/39 |
| 6,059,326 | A | * | 5/2000 | Tramontina | 292/169 |
| 6,076,869 | A | | 6/2000 | Chen et al. | |
| 6,115,239 | A | * | 9/2000 | Kim | 361/681 |
| 6,707,665 | B2 | * | 3/2004 | Hsu et al. | 361/681 |
| 6,714,408 | B1 | * | 3/2004 | Wang et al. | 361/683 |
| 7,050,295 | B2 | * | 5/2006 | Kang | 361/683 |
| 7,088,588 | B2 | * | 8/2006 | Lee | 361/725 |
| 2006/0109637 | A1 | * | 5/2006 | Jiang et al. | 361/801 |

* cited by examiner

*Primary Examiner*—Gary Estremsky
(74) *Attorney, Agent, or Firm*—Morris Manning Martin LLP; Tim Tingkang Xia

(57) ABSTRACT

A portable computer includes a cover unit (10) and a base unit (20) connected with the cover unit. The cover unit includes a movable latch member (30), a driving member (40), and a cam member (31). The cam member is fixed to the latch member and includes a following portion (311). The driving member includes a driving portion engaging (411) with the following portion to move the latch member. The cover unit is latched to the base unit via the latch members to cover the base unit and unlatched from the base unit via moving the latch member by manipulation of the driving member.

13 Claims, 6 Drawing Sheets

PORTABLE COMPUTER HAVING IMPROVED LATCH MECHANISM

BACKGROUND OF THE INVENTION

1. Field of the Invention

The present invention relates to a portable computer, and more particularly to a portable computer which includes a reliable latch mechanism.

2. General Background

Portable computers, such as laptop computers and notebook computers, have become increasingly popular for general use. Generally, a portable computer includes a cover unit and a base unit pivotally connected with the cover unit, and the cover unit is folded onto the base unit to cover the base unit when the portable computer is not in use. A latch mechanism is provided to lock the cover unit to the base unit.

As disclosed in China Patent No. 01208955.9, a portable computer includes a latch mechanism which acts to lock a cover unit to a base unit when the portable computer is not in use. The latch mechanism includes a hook for engaging the base unit, and a post movably embedded in the base unit for disengaging the hook from the base unit. An end portion of the post is exposed outside the base unit for facilitating pushing the post to disengage the hook from the base unit. However, the end portion of the post is liable to be accidentally touched resulting in undesired opening of the cover unit.

What is desired, therefore, is a portable computer which has an improved reliable latch mechanism.

SUMMARY

In one preferred embodiment, a portable computer includes a cover unit and a base unit connected with the cover unit. The cover unit includes a movable latch member, a cam member, and a driving member. The cam member is fixed to the latch member and includes a following portion. The driving member includes a driving portion engaging with the following portion to move the latch member. The cover unit is latched to the base unit via the latch member to cover the base unit and unlatched from the base unit via moving the latch member by manipulation of the driving member.

Other advantages and novel features will become more apparent from the following detailed description of preferred embodiments when taken in conjunction with the accompanying drawings, in which:

DETAILED DESCRIPTION OF THE EMBODIMENT

Figure 1:
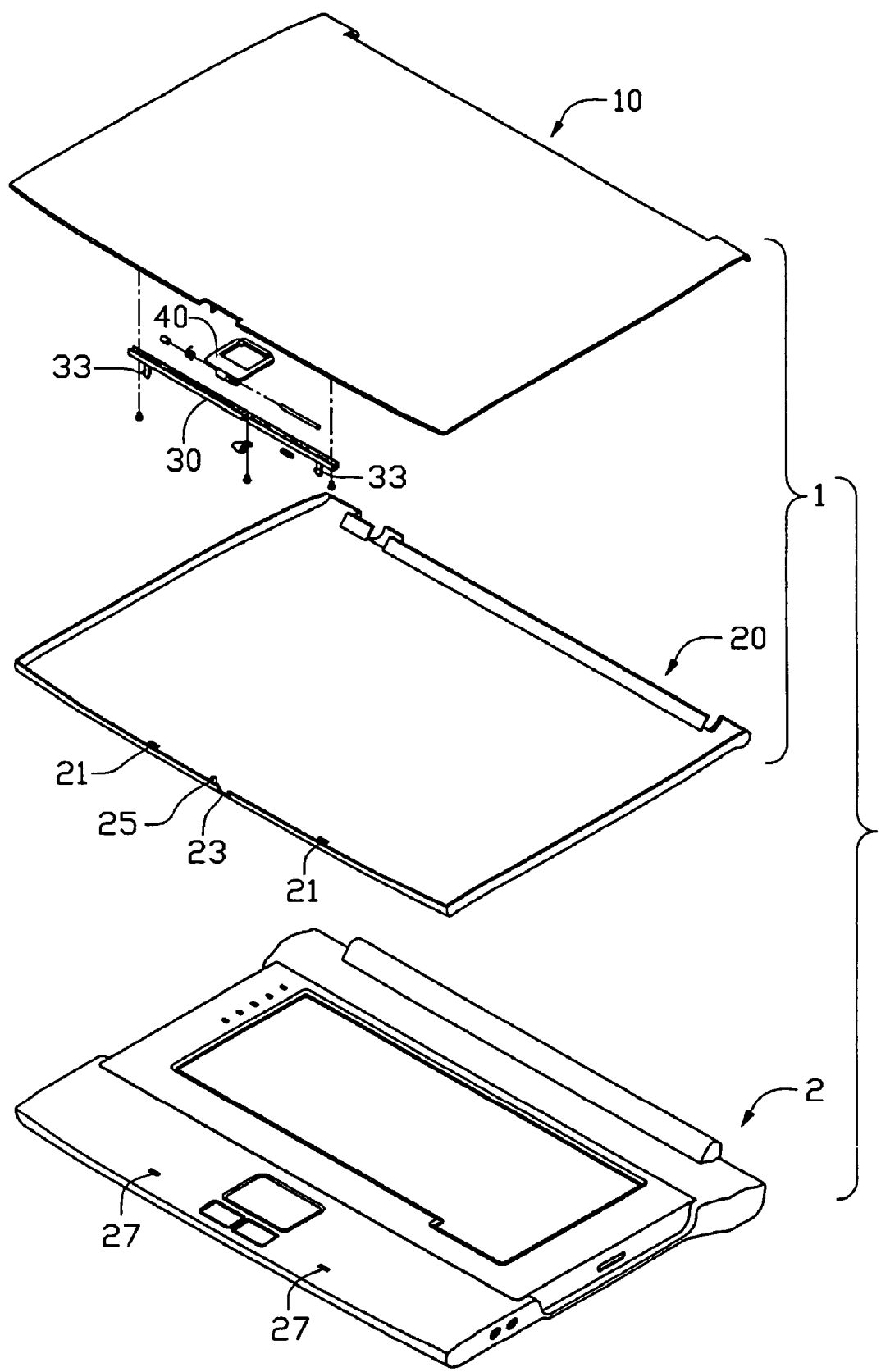
FIG. 1 is an exploded, isometric view of a portable computer in accordance with a preferred embodiment of the present invention, the portable computer including a base unit, a cover unit and a latch mechanism.
Figure 2:
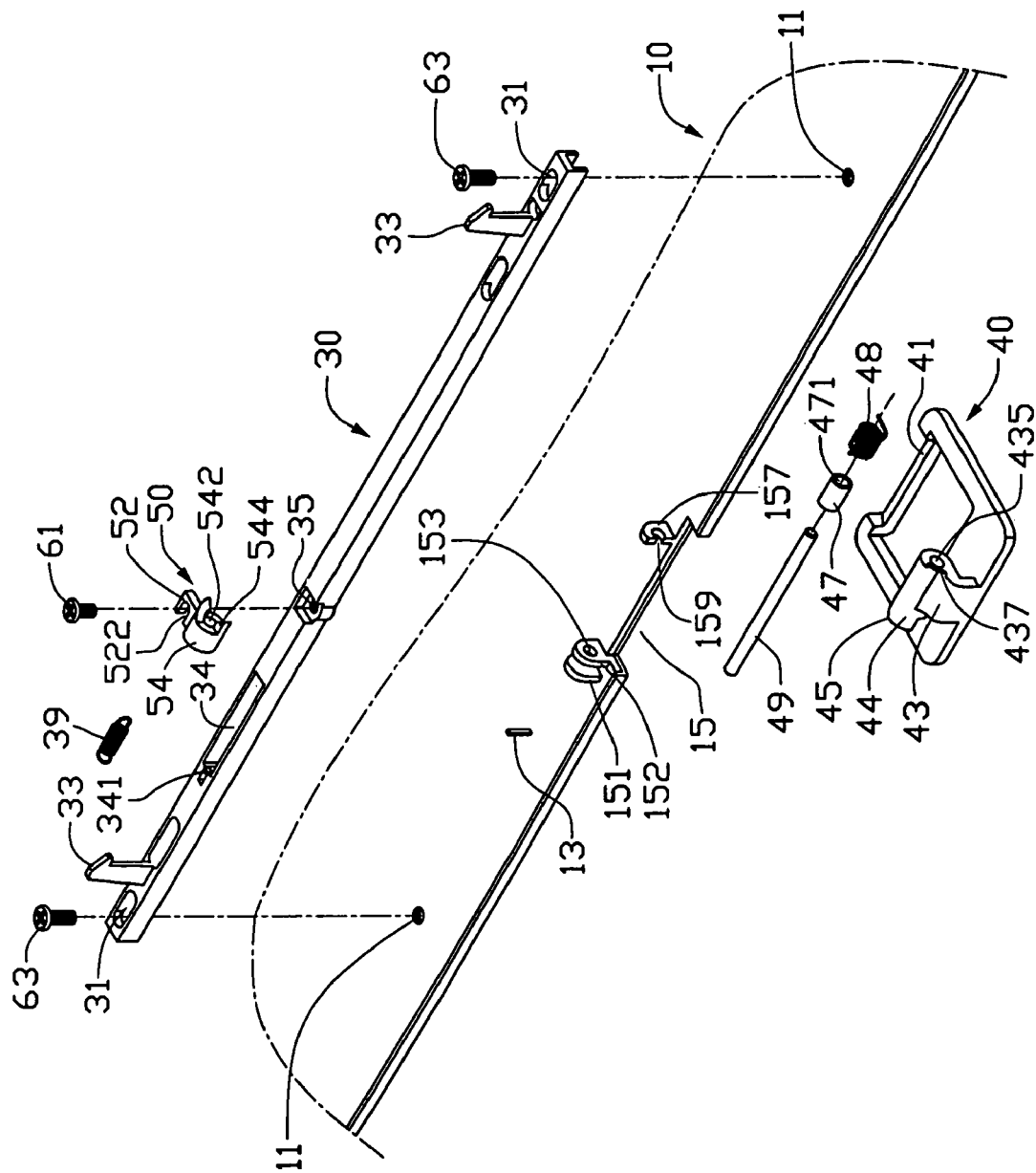
FIG. 2 is an enlarged isometric view of part of the cover unit and the latch mechanism of FIG. 1, but viewed from another aspect.

Referring to FIGS. 1 and 2, a portable electronic device like a portable computer includes a cover unit 1 and a base unit 2 pivotally connected to a rear portion of the cover unit 1. The cover unit 1 includes a latch mechanism disposed at a front portion thereof for locking the cover unit 1 to the base unit 2 when the portable computer is not in use.

The latch mechanism includes a latch member 30 used as one of engagement means to engage the cover unit 1 with the base unit 2, a driving member 40 generally disposed at external surface of the cover unit 1 for facilitating manipulating the latch mechanism, and a cam member 50 fixed on the latch member 30.

The cover unit 1 includes a panel 10 and a housing 20. A pair of spaced threaded holes 11 is defined in an internal side of the panel 10 adjacent a front edge. A post 13 depends from the internal side of the panel 10 adjacent a left threaded hole 11. A cutout 15 is defined in the panel 10 by cutting rearward from the front edge thereof. A first projection 152 is formed adjacent the cutout 15 with a through hole 153 defined therein, and a first stopper 151 is arranged adjacent the first projection 152. A second projection 157 is formed parallel to the first projection 152. A notch 159 is defined in the second projection 157 in alignment with the through hole 153 of the first projection 152.

Referring particularly to FIG. 1, the housing 20 defines a pair of apertures 21. An opening 23 is defined in a front wall of the housing 20, and a second stopper 25 is arranged adjacent the opening 23.

Referring to FIG. 2, the latch member 30 includes a longitudinal body defining a pair of slot 31 in a two opposite ends thereof, the slot 31 corresponding to a respective threaded hole 11 of the panel 10. A pair of hooks 33 is arranged adjacent the slots 31, and corresponding to respective apertures 21 of the housing 20. A groove 34 is defined in a left portion of the body corresponding to the post 13 of the panel 10. A beam 341 is arranged in the groove 34 in cooperation with the respective post 13 to attach a coil spring 48 in the groove 34. A threaded hole 35 is defined in a middle portion of the body.

Figure 3:
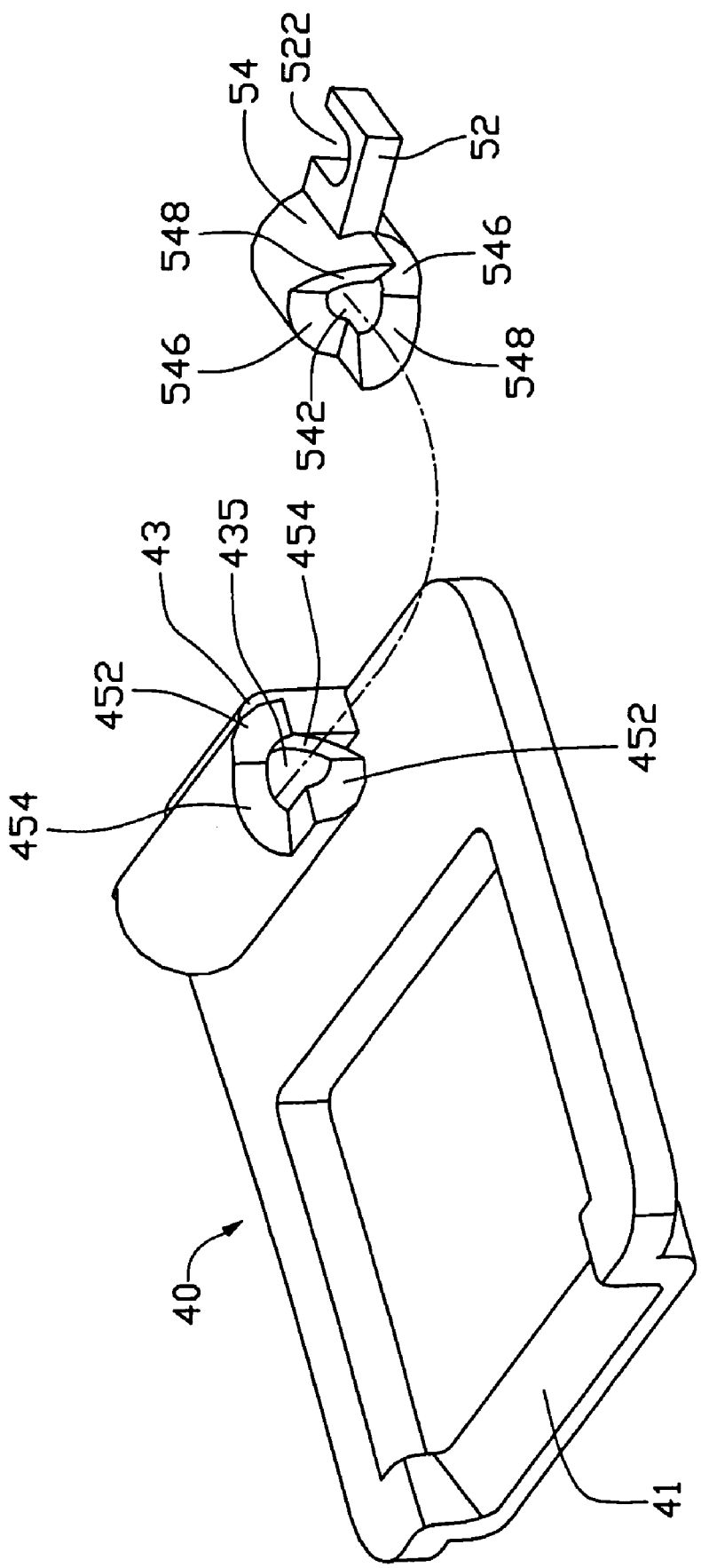
FIG. 3 is an enlarged isometric view of part of the latch mechanism of FIG. 2, but viewed from another aspect.

As shown in FIG. 2 and FIG. 3, the driving member 40 includes a generally rectangle bracket. A handgrip portion 41 is formed at a rear edge portion of the bracket, a protrusion 43 protrudes downward from a front edge portion of the bracket and then extends slantingly toward the rear edge portion thereof, and a cylindrical portion 44 formed from an end of the protrusion 43. A first pivot hole 435 is defined through the cylindrical portion 44. A driving portion 45 is formed on one end of cylindrical portion 44 around the first pivot hole 435. The driving portion 45 includes a pair of first plane surfaces 452, and a pair of first slanting surfaces 454 each separately extending outwardly from edges of the first plane surfaces 452. The first slanting surfaces 454 of the driving member 40 can separately extend inwardly from edges of the first plane surfaces 452. A flange 437 protrudes outward from another end of the cylindrical portion 44 adjacent the first pivot hole 435. A shaft 49 is provided to attach the driving member 40 to the panel 10.

The cam member 50 includes a connecting portion 52, and a cylindrical body 54. A hole 522 is defined in the connecting portion 52, corresponding to the threaded hole 5 of the latch member 30. A screw 61 is provided to attach the cam member 50 to the latch member 30. A second pivot hole 542 is defined through the cylindrical body 54. A following portion 544 is formed on one end of the cylindrical body 54 around the second pivot hole 542, corresponding to the driving portion 45 of the driving member 40. The following portion 544 includes a pair of second plane surface 546 and a pair of second slanting surface 548 interposed formed on the following portion 544.

Referring back to FIG. 1, the base 2 defines a pair of apertures 27 used as another one of engagement means at a front portion thereof corresponding to the hooks 33 of the latch member 30 respectively as complementary parts of the latch member 30.

In assembly, the driving member 40 is positioned relative to the panel 10, with the bracket of the driving member 40 engaging an external surface of the panel 10 and overlapping the cutout 15 of the panel 10. A torsion spring 39 is provided to mate with a bushing 47. The shaft 49 is extended through the notch 159 of the second projection 157, a through hole 471 of the bushing 47, the first pivot hole 435 of the cylindrical portion 44, the second pivot hole 542 of the cam member 50, and the through hole 153 of the first projection 152 in sequence until the first stopper 151 prevents further movement of the shaft 49. Two free ends of the torsion spring 48 engage the flange 437 of the cylindrical portion 44 and the second projection 157 respectively.

The latch member 30 is slidably attached to the panel 10 with two fasteners 63 engaging in the threaded holes 11 respectively. The post 13 is received in the grooves 34 of the latch member 30 respectively. The coil spring 39 is received in the grooves 34, with its two free ends attached to the post 13 and the beam 341 respectively.

Figure 4:
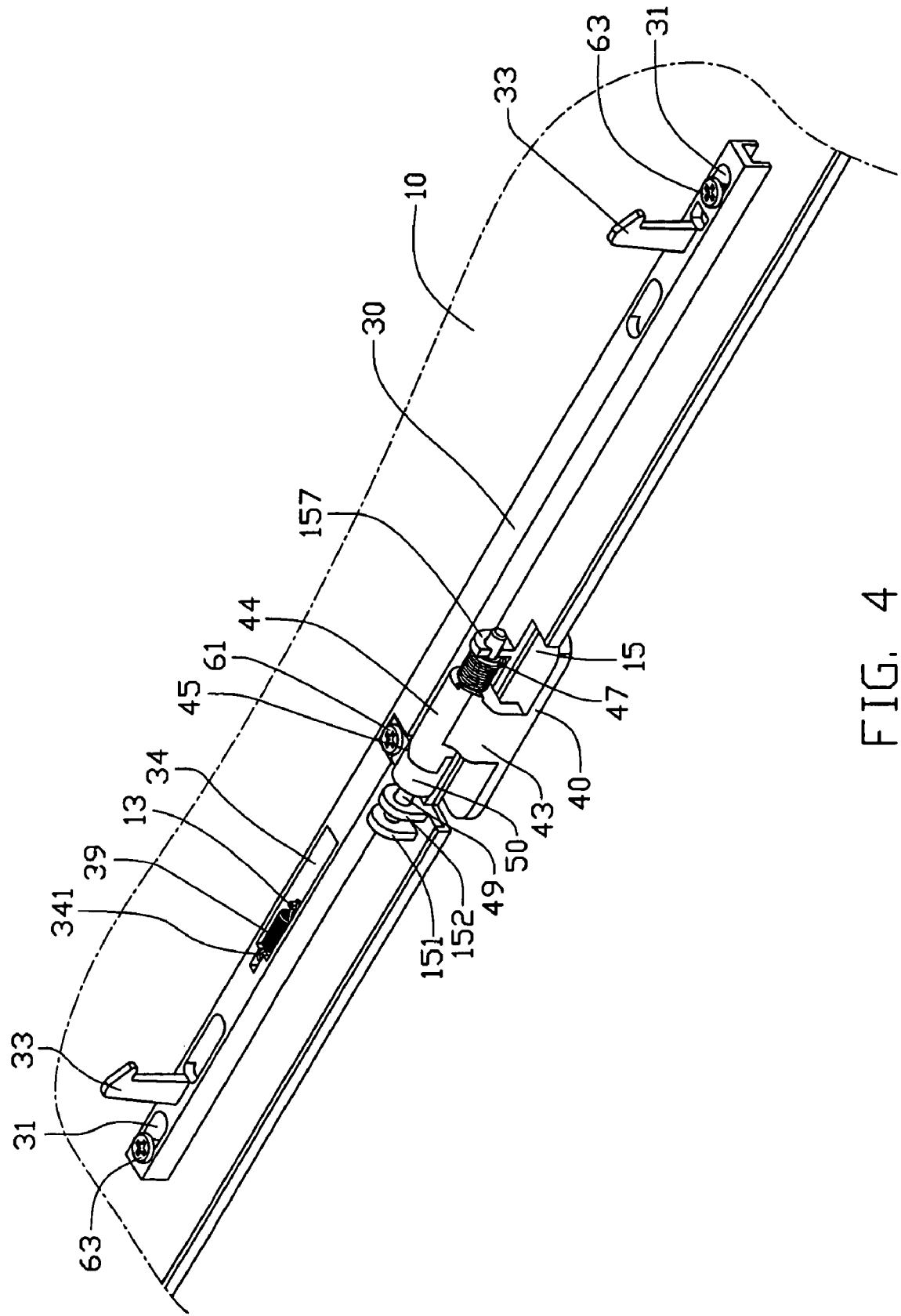
FIGS. 4 and 5 are assembled views of FIG. 2, respectively schematically showing the latch mechanism in different working states.
Figure 5:
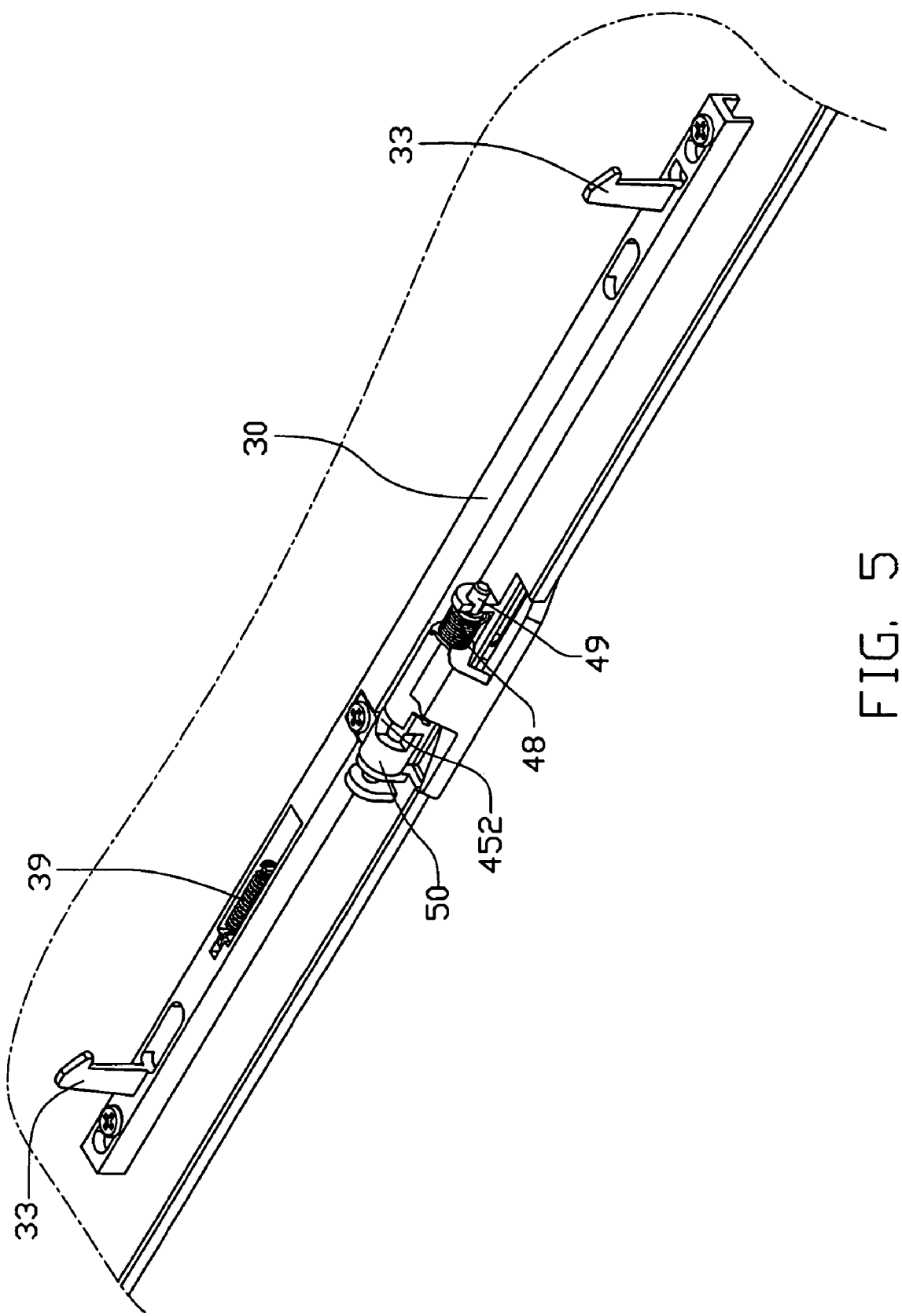

The cam member 50 is fixed to the latch member 30 with the screw 61 extending through the hole 522 to engage in the threaded hole 35 of the latch member 30. The cam member 50 also can be integrated with the latch member 30. The first plane surfaces 452 abut against the second plane surfaces 546, and the first slanting surface 454 abut against the second slanting surface 548. FIG. 4 and FIG. 5 separately show an assembled view of FIG. 2.

The housing 20 is then assembled with the panel 10 to form the cover unit 1, and the hooks 33 of the latch member 30 protrudes outward from the apertures 21 of the housing 20 respectively. The opening 23 of the housing 20 corresponds to the protrusion 43 of the driving member 40 for allowing free rotation of the driving member 40 (see FIG. 6). The second stopper 25 of the housing 20 engages an end of the shaft 49 adjacent the second projection 157 of the panel 10 for preventing axial movement of the shaft 49.

Figure 6:
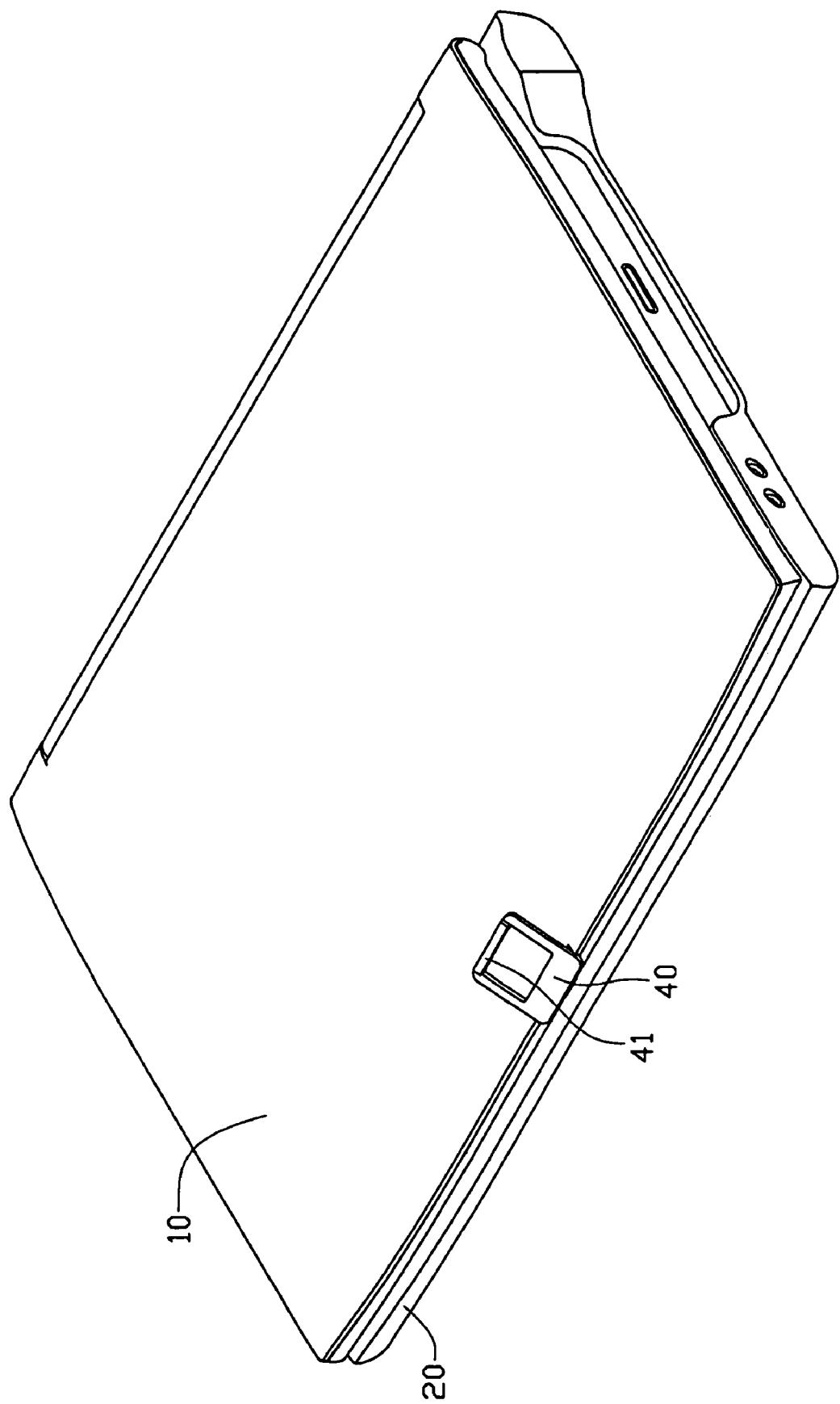
FIG. 6 is an assembled view of FIG. 1.

As shown in FIG. 6, the cover unit 1 is pivotally attached to the base unit 2, and the cover unit 1 is folded to cover the base 2, with hooks 33 engaging in the apertures 27 and latching the base unit 2. FIG. 4 shows the working state of the latch mechanism when the cover unit 1 covers the base unit 2.

To open the cover unit 1 from the base unit 2, the driving member 40 is lifted up by the handgrip portion 41 and rotated outward. As shown in FIG. 5, the torsion spring 48 is twisted. The first slanting surface 454 of the driving portion 45 of the driving member 40 abut against the second slanting surface 548 of the following portion 544 of the cam member 50, and drives the latch member 40 to extend the coil springs 39. The hooks 33 are thereby disengaged from the apertures 27 of the base unit 2 respectively. The cover unit 1 is ready to be opened. When the driving member 40 is released, the torsion spring 48 is restored to rotate the driving member 40 toward the cover unit 1, and the coil springs 39 are restored to move the latch member 30 back respectively.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A portable computer, comprising:
a cover unit comprising a latch member, a cam member attached to the latch member, and a driving member pivotably manipulated to urge the cam member thereby moving the latch member, and a torsion spring associated with the driving member to restore the driving member; and
a base unit connected with the cover unit, the cover unit latched to the base unit via the latch member to cover the base unit and unlatched from the base unit via moving the latch member by manipulation of the driving member;
wherein the driving member comprises a bracket and a protrusion defining a pivot hole therein, a shaft is associated with the cover unit and extended through the pivot hole to support pivoting of the driving member, and the protrusion forms a driving portion corresponding to the cam member.

2. The portable computer as claimed in claim 1, wherein the driving portion comprises at least a first plane surface, and at least a first slanting surface connected to an edge of the plane surface, the cam member comprises a following portion engaging with the driving portion, the following portion comprises at least a second plane surface and at least a second slanting surface separately abutting against said first plane surface and said slanting surface.

3. The portable computer as claimed in claim 1, wherein the torsion spring is attached to the shaft, a flange is formed on the protrusion of the driving member, and a free end of the torsion spring engages the flange.

4. The portable computer as claimed in claim 1, wherein the bracket of the driving member is generally arranged at an external surface of the cover unit for facilitating manipulating the driving member, and the protrusion of the driving member is generally arranged inside the cover unit.

5. The portable computer as claimed in claim 1, wherein the latch member comprises a pair of hooks protruding outward from the cover unit, and a pair of apertures is defined in the base unit for receiving the hooks respectively.

6. The portable computer as claimed in claim 1, wherein a pair of slots is defined in two ends of the latch member, and a pair of fasteners is extended through the slots to slidably attach the latch member to the cover unit.

7. The portable computer as claimed in claim 6, wherein a spring is provided to restore the latch member along the fastener after the cover unit is unlatched from the base unit.

8. A combination comprising:
a cover unit;
a latch mechanism comprising a latch member movably received in the cover unit, and a driving member rotatably attached to the cover unit about an axis to move the latch member along said axis, the latch member comprising at least one hook protruding outward from the cover unit, the driving member comprising a bracket generally arranged at an external surface of the cover unit for facilitating manipulating the driving member, and a protrusion generally arranged inside the cover unit; and
a base unit defining at least one aperture corresponding to said hook, said hook entering said aperture and latching the base unit to attach the cover unit to the base unit, and the driving member being rotated to drive the latch member thereby unlatching said hook from the base unit.

9. The combination as claimed in claim 8, wherein farther comprising a cam member fixed on the latch member, wherein the cam member and comprises a following portion at one end thereof and the driving member comprises a driving portion to engage the following portion.

10. The combination as claimed in claim 9, wherein the driving portion comprises at least a first plane surface, and at least a first slanting surface connected to an edge of the plane surface, the following portion comprises at least a second plane surface, at least a second slanting surface separately abutting against the first plane surface and the slanting surfaces.

11. The combination as claimed in claim 8, wherein a torsion spring is associated with the protrusion to restore the driving member.

12. The combination as claimed in claim 8, wherein a pair of slots is defined in the latch member, a pair of fasteners is extended through the slots to attach the latch member to the cover unit, and a spring is provided to restore the latch member along the fastener after the cover unit is unlatched from the base unit.

13. An electronic device comprising:
- a base unit enclosing a part of said electronic device, and comprising a first engagement means thereon;
- a cover unit enclosing the other part of said electronic device and attachably disposed beside said base unit, said cover unit comprising a second engagement means thereon and movable between a first position thereof where said cover unit is capable of moving against a side of said base unit and covering thereon, and a second position thereof where said cover unit is capable of moving away to expose said side of said base unit, said second engagement means capable of engaging with said first engagement means so as to securely retain said cover unit in said first position thereof when said cover unit moves from said second position thereof to said first position thereof and
- a driving member attachably installable to one of said base unit and said cover unit, and rotatably movable relative to said one of said base unit and said cover unit, said driving member being drivable by a user of said electronic device to generate rotary movement thereof, and reachable to a selective one of said first and second engagement means to urge movement of said selective one of said first and second engagement means during said rotary movement thereof, said rotary movement of said driving member leading to linear movement of said selective one of said first and second engagement means so as to disengage said first engagement means from said second engagement means, the driving member comprising a bracket generally arranged at an external surface of the cover unit or the base unit for facilitating pivotably manipulating the driving member, and a protrusion generally arranged inside the cover unit or the base unit to linearly move the first engagement means;
- wherein a direction of said linear movement of said selective one of said first and second engagement means is parallel to a rotary axis of said rotary movement of said driving member.

* * * * *